US008357036B1

(12) United States Patent
Dorr

(10) Patent No.: US 8,357,036 B1
(45) Date of Patent: Jan. 22, 2013

(54) PLAYER ATTRACTION GAME AND METHOD OF PLAY FOR LEASED GAMING MACHINES

(76) Inventor: Robert C. Dorr, Colorado City, CO (US)

( * ) Notice: Subject to any disclaimer, the term of this patent is extended or adjusted under 35 U.S.C. 154(b) by 0 days.

(21) Appl. No.: 13/177,987

(22) Filed: Jul. 7, 2011

(51) Int. Cl.
*A63F 13/10* (2006.01)
*A63F 13/12* (2006.01)
*A63F 9/24* (2006.01)

(52) U.S. Cl. ................................ 463/25; 463/16; 463/30

(58) Field of Classification Search .............. 463/16–22, 463/25, 30
See application file for complete search history.

(56) References Cited

U.S. PATENT DOCUMENTS

| | | | | |
|---|---|---|---|---|
| 6,077,163 | A * | 6/2000 | Walker et al. | 463/26 |
| 6,758,749 | B2 | 7/2004 | Krintzman | |
| 6,942,574 | B1 | 9/2005 | LeMay et al. | |
| 7,083,520 | B2 * | 8/2006 | Rowe | 463/42 |
| 7,686,688 | B2 * | 3/2010 | Friedman et al. | 463/25 |
| 7,744,468 | B2 | 6/2010 | Boyd et al. | |
| 7,908,169 | B2 | 3/2011 | Hettinger | |
| 7,934,989 | B2 | 5/2011 | Joshi et al. | |
| 2003/0083943 | A1 * | 5/2003 | Adams et al. | 705/14 |
| 2005/0003883 | A1 * | 1/2005 | Muir et al. | 463/16 |
| 2006/0148560 | A1 | 7/2006 | Arezina et al. | |
| 2012/0083909 | A1 * | 4/2012 | Carpenter et al. | 700/92 |

OTHER PUBLICATIONS

Las Vegas Direct. How to Play Slots in Las Vegas and Win! [online], [retrieved on Jul. 5, 2011]. Retrieved from the Internet <URL: http://www.lasvegasdirect.com/las-vegas-how-to-play-slot-machines.html>.

Las Vegas Sun. Technology allows advertising on idle slot machines [online], [retrieved on Jul. 5, 2011]. Retrieved from the Internet <URL: http://www.lasvegassun.com/news/2010/jul/03/slots-offer-ad-exposure>.

Casino Enterprise Management. Gaming Floors of the Future, Part V: An Analyst's Guide to Slot Floor Optimization [online], [retrieved on Jul. 5, 2011]. Retrieved from the Internet <URL: http://www.casinoenterprisemanagement.com/articles/november-2010/gaming-floors-future-part-v-analyst%E2%80%99s-guide-slot-floor-optimization>.

Tuscaloosa News. From the Back Office, a Casino Can Change the Slot Machine in Seconds [online], [retrieved on Jul. 6, 2011]. Retrieved from the Internet: <URL: httl://publicaffairs.unlv.ath.cx/articles/Daily%20Clips/04-12-2006.From%20the%20back%20-office,%20a%20casino%20can%20change%20the%20slot%20-machine%20in%20seconds%20(Tuscaloosa%20News).PDF>.

* cited by examiner

*Primary Examiner* — Peter DungBa Vo
*Assistant Examiner* — Bach Hoang

(57) ABSTRACT

An attraction game commencing play for a number of successive wagers in a leased gaming machine. For leased gaming machines, the attraction game provides trial game play based on actual wagers with information on each outcome, but with all wagers returned to the player. For idle gaming machines, the attraction game is hidden from the player and the owner of the gaming machine may invest a fixed amount of money so that the player receives all money wagered plus the invested amount. Each attraction game outcome corresponds to a base game outcome having a low value base game award.

9 Claims, 9 Drawing Sheets

500

BASE GAME PAY TABLE
(PRIOR ART)

| OUTCOME | GAME AWARD GA |
|---|---|
| 777 | $10,000 |
| | |
| 3 CHERRIES | 100 COINS |
| 3 BARS | 6 COINS |
| 3 BLANKS | 3 COINS |
| 2 CHERRIES | 2 COINS |
| 1 CHERRY | 1 COIN |
| ANY LOSING OUTCOME | 0 |

FIGURE 5

600

ATTRACTION GAME PAY TABLE

| OUTCOME | ATTRACTION AWARD AA | INFO |
|---|---|---|
| 3 BARS | 6 COINS | D1 |
| 3 BLANKS | 3 COINS | D2 |
| 2 CHERRIES | 2 COINS | D3 |
| 1 CHERRY | 1 COIN | D4 |

FIGURE 6

740 ATTRACTION GAME

| n | OUTCOME | AA | △ |
|---|---|---|---|
| 1 | 3 BLANKS | 3 | 0 |
| 2 | 1 CHERRY | 1 | 2 |
| 3 | 2 CHERRIES | 2 | 3 |
| 4 | 3 BARS | 6 | 0 |

750 BASE GAME

| OUTCOME | GA |
|---|---|
| LOSE | 0 |
| LOSE | 0 |
| LOSE | 0 |
| LOSE | 0 |

350

ATTRACTION GAME

| n | OUTCOME | AA | △ |
|---|---|---|---|
| 1 | 2 CHERRIES | 2 | 1 |
| 2 | 3 BLANKS | 3 | 1 |
| 3 | 1 CHERRY | 1 | 3 |
| 4 | 3 BARS | 6 | 0 |
| 5 | 3 BLANKS | 3 | 0 |

350

BASE GAME

| OUTCOME | GA |
|---|---|
| LOSE | 0 |
| 2 CHERRIES | 2 |
| LOSE | 0 |
| 3 BLANKS | 3 |
| LOSE | 0 |

FIGURE 8

| WAGER | A G OUTCOME | AA | △ |
|---|---|---|---|
| ⋮ | | ⋮ | ⋮ |
| n-2 | | | 1 |
| n-1 | 1 CHERRY | 1 | 3 |
| n | 3 BLANKS | 3 | 0 |

900

910

PAY TABLE
FIG. 6

FIGURE 9

1100

| n | OUTCOME | AA | △ |
|---|---|---|---|
| 1 | 3 BARS | 6 | -3 |
| 2 | 1 CHERRY | 1 | -1 |
| 3 | 3 BLANKS | 3 | -1 |
| 4 | 3 BARS | 6 | -4 |

FIGURE 11

PLAYER ATTRACTION GAME AND METHOD OF PLAY FOR LEASED GAMING MACHINES

RELATED APPLICATIONS

This application is related to U.S. patent application Ser. No. 13/177,776 filed Jul. 7, 2011 entitled "Hidden Universal Player Attraction Game and Method of Play for Idle Gaming Machines" and having the same inventor.

COPYRIGHT NOTICE

A portion of the disclosure of this patent document contains or may contain material subject to copyright protection. The copyright owner has no objection to the reproduction of the patent document or the patent disclosure in exactly the form it appears in the Patent and Trademark Office patent file or records, but otherwise reserves all copyright rights.

FIELD OF THE INVENTION

The invention relates to casino gaming machines and methods and, more particularly, to leased player operated gaming machines and methods having player attraction features.

BACKGROUND OF THE INVENTION

Casino operators have been long concerned with losing revenue when new or old gaming machines sit idle. Each gaming machine occupies a footprint on the casino floor and casino operators desire that each gaming machine achieve a certain level of revenue return. One traditional factor used by casino operators to measure revenue return is the win per unit (WPU) per day. Gaming machines having a WPU above a certain amount may cause a casino to acquire more of these gaming machines whereas having a WPU below may cause the casino to remove them.

Attraction features have been used by casinos to encourage players to play idle gaming machines. One feature is to incorporate advertising or promotions into the audio and visual components of a gaming machine to attract potential players to sit and play the gaming machine so as to increase revenue to the casino. From the casino's viewpoint such advertising and promotions also provides an additional source of revenue for the idle gaming machine. Some players, however, upon seeing such advertising may shy away from playing these idle gaming machines believing them to be "cold" (i.e., not winning). A continuing need exists for new attraction features to encourage play of idle gaming machines especially those gaming machines that have remained idle for some period of time.

Casino operators using a network are also able to access an individual gaming machine to download multi-themed base games, change the payback percentages and change other game criteria based on time of day, seasons, holidays, new games, new themes, etc. In some states, payback percentages may be changed if the gaming machine is idle for a time (such as 4 minutes) and then the machine must remain idle after the change for another period of time (such as 4 minutes). Further, the screen of the gaming machine should inform players of the change in configuration. A need exists to provide an attraction game that plays in parallel with any conventional downloadable themed base game and that does not interfere with the play of or the payback percentages for such a multi-themed base game.

Manufacturers may lease gaming machines to casinos and some manufacturers base the lease on a share of the wagers made on the gaming machine. U.S. Pat. No. 7,908,169 sets forth one approach for leasing gaming machines which provide in FIGS. 14 and 15 attraction sequences that may be performed in an attempt to induce a potential player to play the leased gaming machine. Here, one or more video images with sound are generated in the gaming machine to attract the player. Any input by the player causes the attraction sequence to terminate so that the player can play the gaming machine. (Col. 23, lines 53-68). From the viewpoint of such manufacturers, a continuing need also exists for new attraction features to encourage play of leased idle gaming machines or to encourage trial play of new gaming machines that players are unfamiliar with.

From the viewpoint of players, most simply want to sit at a gaming machine and win. Some players may ask casino personnel which gaming machines are "hot." Or, some players may drift from idle gaming machine to idle gaming machine and insert a wager to see if the gaming machine is "hot" or "cold". Often, such drifting players do not even sit at the idle gaming machine and may remain standing to place a few wagers and see what happens. After a few plays of not winning, the player may decide that the gaming machine is cold and drift to another gaming machine. But, after a few plays of winning, even small amounts, the player may sit at the gaming machine believing that the gaming machine is "hot" or at least "warm." Gaming machines use random number generators and so the player's feeling that a machine is hot, warm or cold may be more psychological than based in fact. A further need exists to provide an attraction game that is hidden, without providing any audible or visible indications, so that the drifting player becomes convinced that the base game of the idle gaming machine is "warm" or "hot."

A final need exists for an attraction game whether hidden or not that is universal with most conventional gaming machines, that does not change base game play and the odds associated with such play, any aesthetic feature of the conventional gaming machine or that the existence of the attraction game cannot be easily determined by the player.

SUMMARY OF THE INVENTION

The invention addresses the aforesaid needs by providing a universal player attraction game, that may or may not be hidden, and a method of play for a leased or network controlled gaming machine. The attraction game of the invention is universal in that it can be retrofitted into existing gaming machines or installed into new or restored gaming machines. The attraction game of the invention may be hidden in that the player is not made aware of the existence of the attraction game and it is difficult for a player to determine its existence or the attraction game may be announced so that the player can trial play a new gaming machine. The attraction game provides attraction game outcomes corresponding to base game outcomes so the player believes that only the base game is being played.

From the viewpoint of the casino and/or the manufacturer, and when the attraction game of the invention is activated, the gaming machine does not primarily generate revenue so the gaming machine is still considered idle with respect to revenue generation. The attraction game of the invention when hidden uses the initial successive wagers to generally fund immediate winning outcomes with payback to the player. This immediate payback may convince the player that the base game of the gaming machine is warm or hot and to remain seated and continue to wager even though the attraction game is over. The attraction game of the invention when announced as a trial game also uses the initial successive wagers to generally fund immediate winning outcomes with payback to the player and with possible informational sequences with each outcome to educate the player in the play of the game such as for a new base game.

From the viewpoint of a player who decides to play an idle machine, the player receives immediate wins and may decide to sit and play the base game after the attraction game (whether hidden or announces) is over. An idle gaming machine must be idle for a determined time period before the attraction game is activated for play. As play of the base game may occur in parallel with play of the attraction game (within the game machine and not apparent to players), when any base game outcome with a higher win occurs, the player receives the higher base game win and play of the attraction game is over. To accomplish this, both the attraction game and the base game are simultaneously run with their outcomes compared internally in the gaming machine during the time the attraction game plays. In other words, play of the base game with its payback percentages are unaffected and the player receives any higher base game awards.

The method of the invention provides a hidden attraction game, in one embodiment, unknowingly played by a player in a gaming machine conventionally having a base game with a base game pay table. The player believes he/she is playing the conventional base game as the attraction game is hidden. An idle time commences when the last game play of the gaming machine occurred such as when a cash out signal was activated by a player. Whenever a new wager is detected and after a determined period of idle time has elapsed, the attraction game, unknown to the player, commences play in the gaming machine for a set number of successive wagers with a goal to immediately award the player with wins so the player believes the gaming machine is warm or hot. For each successive wager in the play of the attraction game, an attraction game outcome is shown in the display resulting in an attraction award from a hidden attraction pay table. However, each attraction game outcome with its attraction award corresponds to a base game outcome in the conventional base game pay table having a low value base game award. End of play for the hidden attraction game occurs upon completion of the set number of successive wagers. At the end of play of the attraction game, a value corresponding to the sum of the attraction awards awarded as wins during the set number of successive wagers mostly equals a value corresponding to the sum of the set number of successive wagers made which achieves the intended result of the invention: i.e., play of the hidden attraction game appears to the player to be play of the base game with base game outcomes and base game wins and the player is not aware of playing the separate attraction game. In another embodiment, the play of the attraction game is announced to the player before play such as trial play for a new game.

The method of the invention may also provide, for each successive wager in play of the hidden attraction game, the conventional random base game outcome with a base game award from the base game pay table with each attraction play outcome. The processor compares internally in the gaming machine the provided attraction game award to the randomly provided base game award and displays to the player the provided attraction game outcome as a win and makes the attraction award to the player when the amount of the provided attraction award differs by a relative value relationship (e.g., is equal to or greater than) to the randomly provided base game award. If not, then the base game award is awarded (e.g., when the base game award is greater than the attraction award). Play of the attraction game in response to displaying the randomly provided base game outcome then ends. The simultaneous play of the hidden attraction game and the base game (unknown to the player), provides game fairness in that, in the event the conventional base game provides a higher win, the player receives it.

The gaming machine of the invention provides in a memory a conventional base game and its pay table. The memory also contains the attraction game with its pay table (whether hidden or announced). The attraction game pay table contains only attraction game outcomes/awards that correspond to base game pay table outcomes having low value awards. The processor in the gaming machine is operatively connected to at least a display, a wager detector, a random number generator and the memory. The processor determines whether a wager has occurred after a determined period of idle time since last game play of the gaming machine. If so, the processor plays, internally in the gaming machine, both the hidden attraction game and the conventional base game for each of a set number of successive wagers. The processor displays the attraction game outcomes with their attraction awards when each attraction award differs by a relative value relationship over the value of the base game award for each of the set number of successive wagers. Otherwise, the processor displays the first base game outcome and base game award that is higher, based on the relative value relationship to the attraction award. The processor ends play of the attraction game when the set number of successive wagers has been made or when the first base game outcome with base game award is displayed. The gaming machine is connected to be in communication over a network with a remote controller such as found at the manufacturer or casino for remotely controlling operation of the attraction game.

The summary set forth above does not limit the teachings of the invention especially as to variations and other embodiments of the invention as more fully set out in the following description taken in connection with the accompanying drawings, which illustrate by way of example, the invention.

BRIEF DESCRIPTION OF THE DRAWINGS

FIG. 5 is an example of selected portions of a base game pay table.

FIG. 6 is the example of an attraction game pay table of the invention having outcomes and payoffs corresponding to some of the base game outcomes with lower awards shown in FIG. 5.

FIG. 8 is an illustration showing attraction game play in a second random outcome embodiment of the invention.

FIG. 9 is an illustration showing attraction game play in a third mapped outcome embodiment of the invention.

FIG. 11 illustrates a hidden attraction game static outcome schedule that pays out more to the player than wagered.

DETAILED DESCRIPTION OF THE INVENTION

Figure 1:
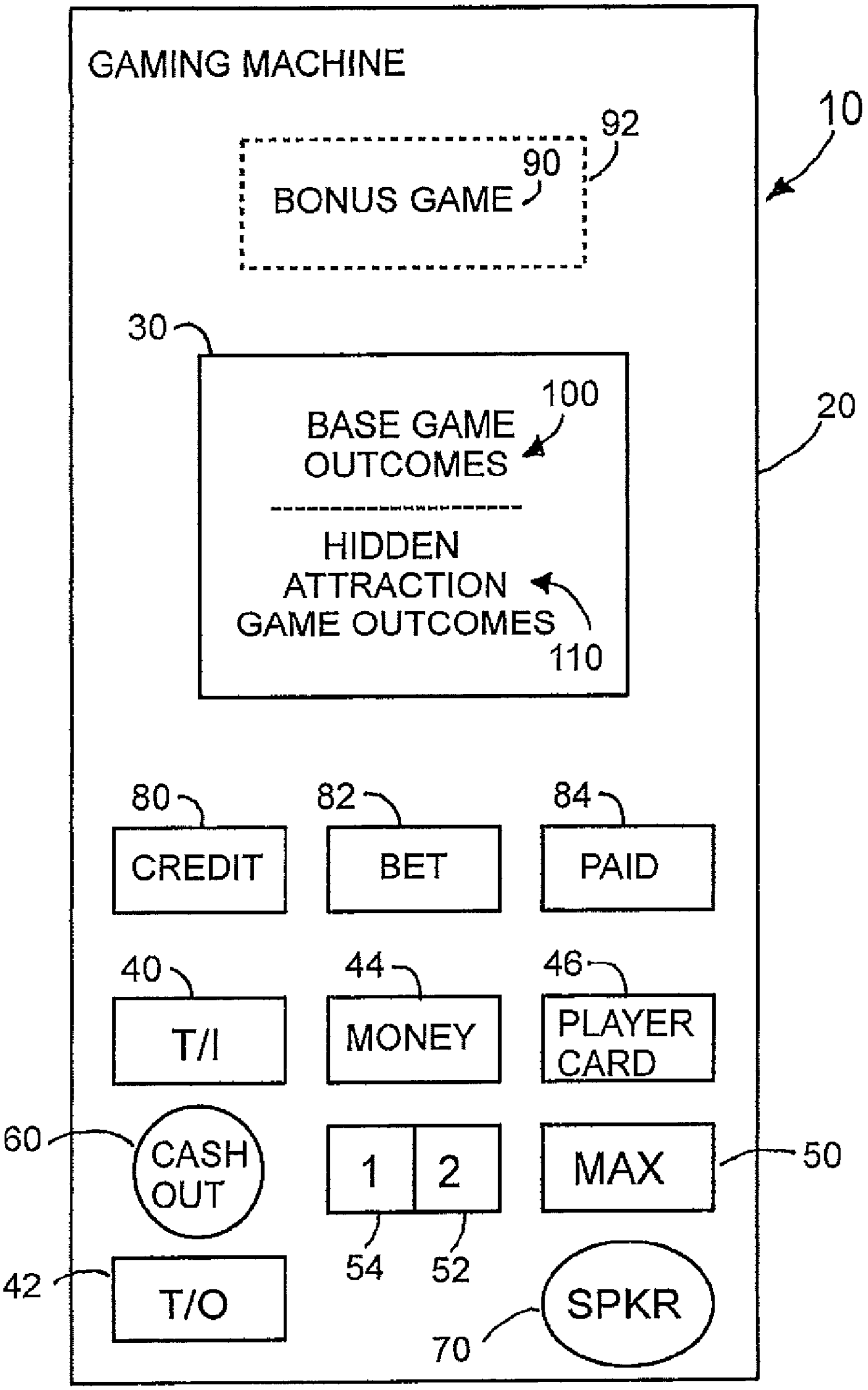
FIG. 1 is an illustration showing an electronic gaming machine of the invention and its various input/output devices.

The gaming machine 10 of the invention is shown in FIG. 1 having a cabinet 20, a touch display 30 on the cabinet 20, a cashless ticket input 40 (T/I), a cashless ticket output 42 (T/O), a currency input 44 (MONEY), and a player card input 46. The machine 10 also has a "max bet" button 50; individual bet buttons such the "bet 2" and "bet 1" buttons 52 and 54; and a cash out button 60. A speaker(s) 70 is provided in the cabinet 20. Credit, bet, and paid displays 80, 82, and 84 are also provided separately as shown or may be incorporated into display 30. An optional bonus game 90 with a display 92 may also be provided. In FIG. 1, the cabinet 20 can be upright or slanted so that a player can be seated to play the game (not shown). All of the above components are conventional to casino gaming machines and the use and operation of each component individually and together are well known. The various components shown are just one embodiment and many conventional design variations are available except for the display of the hidden attraction outcomes 110 of the invention. The casino gaming machine 10 provides conventional base game 222 play with outcomes 100 in display 30 or the attraction game 230 play with outcomes 110 of the invention.

Figure 2:
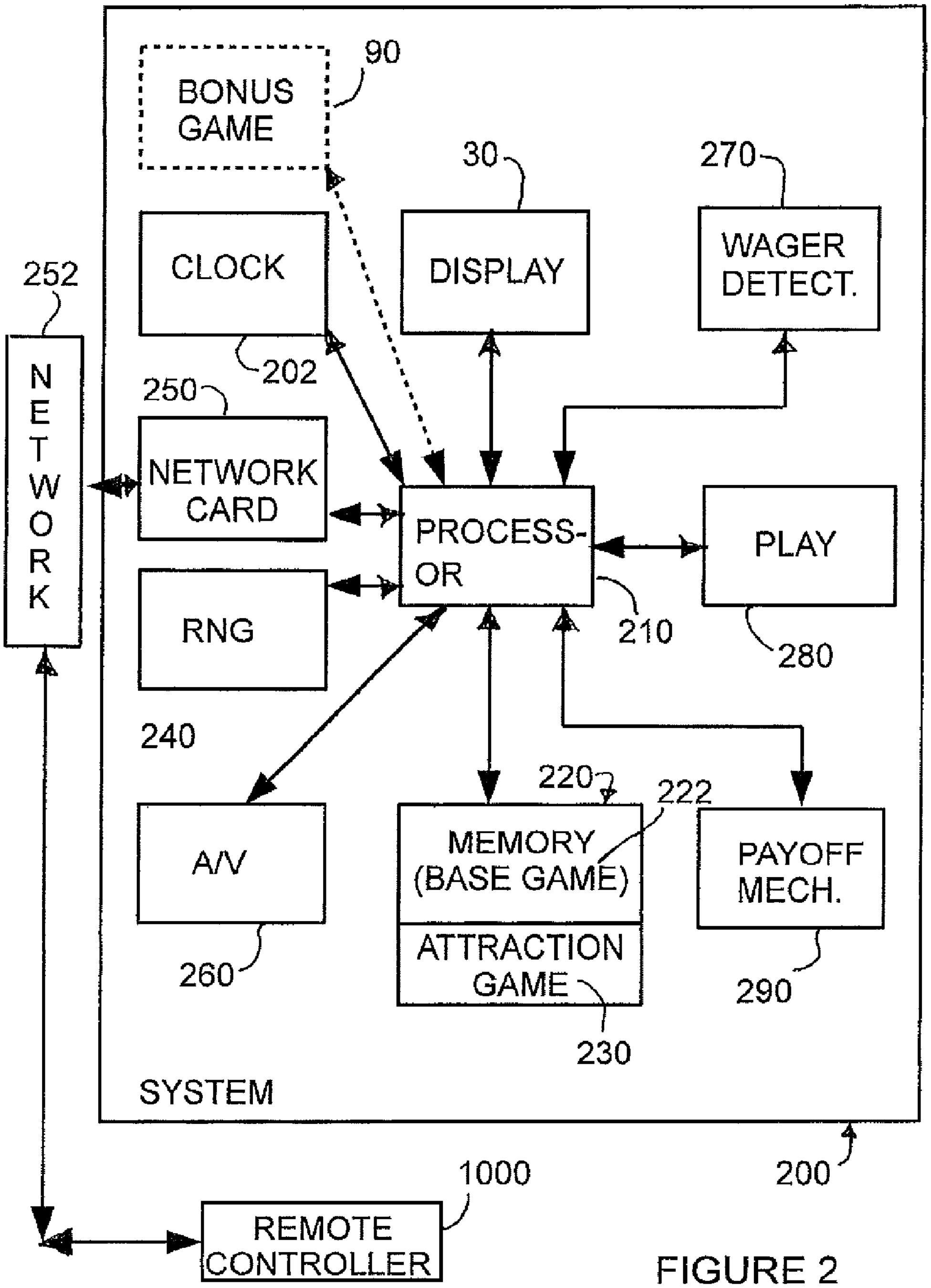
FIG. 2 is a block diagram of the system of the invention showing the components and the interconnection of the components.

The system components 200 are more functionally shown in the block diagram of FIG. 2. A processor 210 is shown which provides operational control. The processor 210 is conventional and may also be termed a micro-processor, a central processing unit (CPU), a controller, etc. The processor 210 has an internal clock 202 (shown separately for convenience) and is connected to a system memory 220 (which contains the base game software 222 and the attraction game software 230 of the invention) and to a random number generator (RNG) 240. The system memory 220 stores the operating software for the gaming machine 10 such as control instructions; any necessary data, inputs and outputs necessary for implementing game play of the base game 222 and the software for the hidden universal player attraction game 230. The system memory 220 is conventional and may use random access memory (RAM) and read only memory (ROM). The RNG 240 may be a separate component as shown and/or may be software within the memory 220. The processor 210 under control of the attraction game software 230 of the invention provides attraction game outcomes 110 in display 30 which may, for example, be a winning outcome (or in another embodiment at least one losing outcome with a no value award) according to an attraction pay table 600 in memory 220. The processor 210 may also interface through a conventional network card 250 to a conventional network 252 which can be a progressive gaming controller, a casino management computer, etc. In FIG. 2, a remote controller 1000 is show in communication with network card 250 over network 252. The remote controller 1000 can be located in the premises of the manufacturer of the gaming machine 10 as will be explained later. With respect to FIG. 1, the processor 210 connects with the touch screen display 30; the optional bonus game 90; a wager detection device 270 (e.g., ticket in 40, currency in 44, bet buttons 50, 52, and 54, credit display 80, bet display 82, etc.); play input device 280 (e.g., the max bet button 50, a play touch input on the screen 30, etc.); audio/visual (A/V) outputs 260 (such as speakers 70, lights, etc.); and a payoff mechanism 290 (e.g., credit display 80; ticket out 42, cash out 60, paid display 84, etc.). The processor 210 is shown to have two-way communication with all system components, but this depends on the system 200 actually used. All of the system components 200 (except the hidden universal player attraction game software 230 of the invention) are conventionally available either individually or together from a number of different sources. Again, the various components shown are just one functional embodiment and many conventional design variations for gaming platforms are available to implement the attraction game of the invention and its various embodiments and variations. For example, in U.S. Pat. No. 7,908,169 B2 owned by IGT, FIG. 12 shows another conventional gaming machine functional component configuration using an input/output circuit 158 connected to the microprocessor 154 and various other components (control panel 66, display 70, etc.).

The hidden universal player attraction game 230 of the invention is universal in that it can be used in most gaming machines as set forth above. The term "attraction game" is used herein as a name for the attraction game described herein and any name for the invention herein may be used. The term "base game play" is used in its conventional sense referring to play of a base game 222 in the gaming machine in response to a wager made by a player. As mentioned in the Background section, some players may drift from gaming machine to gaming machine looking for a warm or hot gaming machine. Drifters usually wager and if no win occurs may move on to a next gaming machine.

Figure 3:
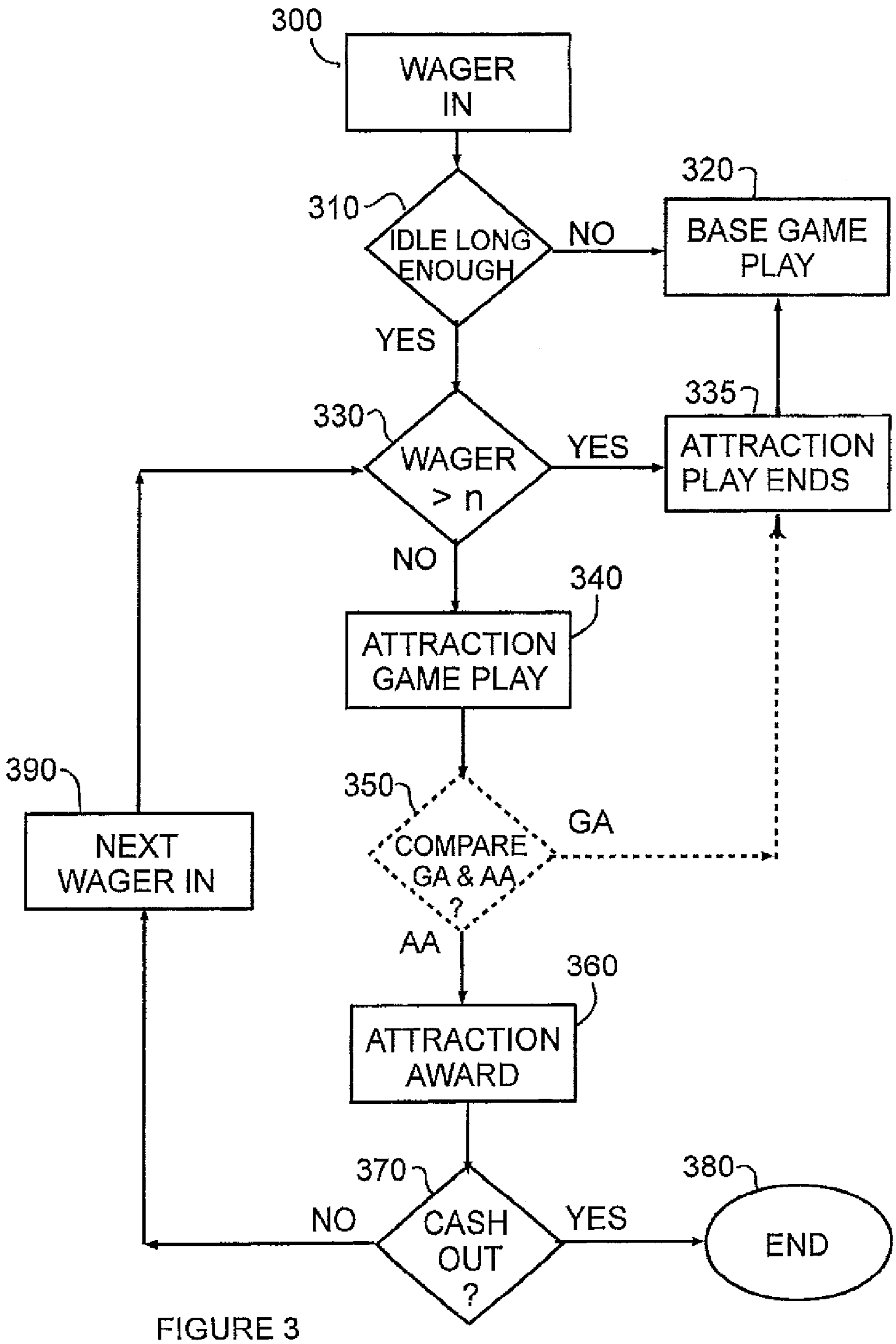
FIG. 3 is a functional flow chart showing the method of play for one embodiment of the attraction game of the invention.

The attraction game 230 works in conjunction with base game only when a gaming machine 10 has sat idle for some time. The term "idle" means the state of a gaming machine when it is not being played. In FIG. 3, the method used in one embodiment of the invention is set forth. A player makes a wager at gaming machine 10 which is sensed in step 300 in the wager detector 270 by the processor 210. With this event, the gaming machine 10 is no longer idle. In step 310, the processor determines whether the gaming machine was idle long enough (a determined period of idle time) in order to activate the attraction game software 230 in memory 220.

Figure 4A:
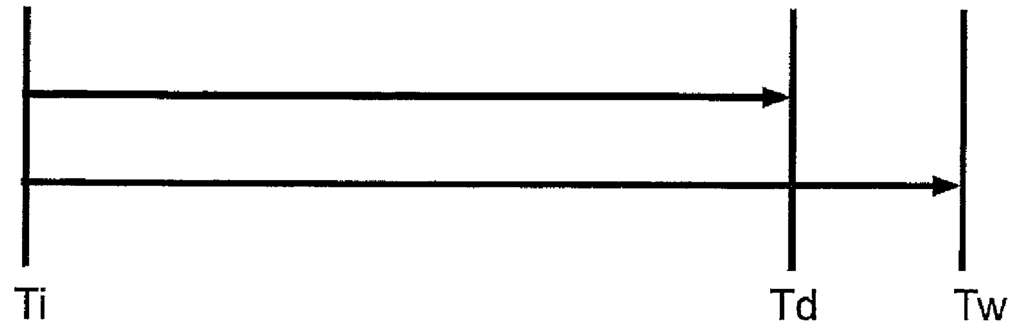
FIG. 4A is an illustration showing an idle gaming machine receiving a wager after a determined period of idle time has occurred thereby allowing play of the attraction game of the invention.
Figure 4B:
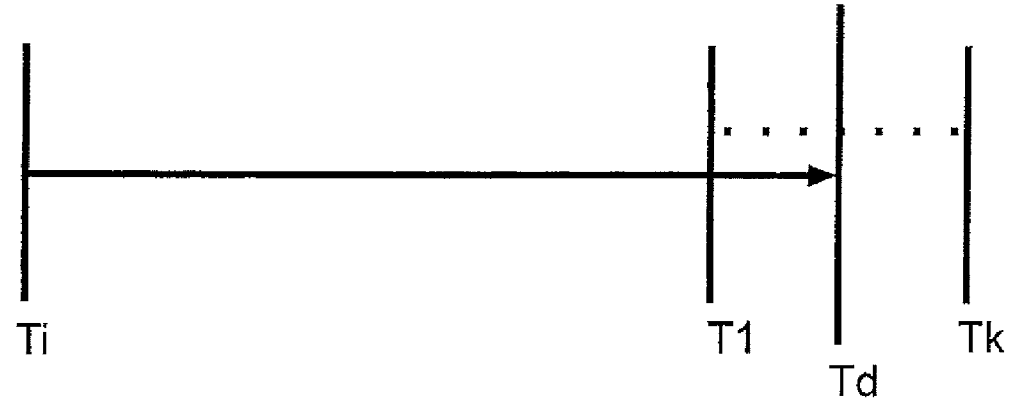
FIG. 4B is an illustration showing that the determined period of idle time of FIG. 4A is randomly selected from a range of times.

In FIG. 4A, the processor 210 using internal clock 202 in step 310 determines how long gaming machine 10 has been idle based on the time of detecting the wager, Tw. If time Tw is greater than or equal to a determined period of idle activation time, Td, the attraction game is activated. If time Tw is less than the determined time, Td, then the attraction game 110 is not activated in step 310 as the gaming machine 10 has not been idle long enough. The activation time, Td, can be any suitable idle time duration as determined by the casino operator (and/or the manufacturer) for a particular gaming machine 10. For example, Td can be 4 hours. The determined time, Td, can also be changed over the network 252 at any time by the operator. As shown in FIG. 4B, a further variation provides the processor 210 to first randomly choose a determined period of time, Td, from a range of times between T1 and Tk. For example, Td can be randomly selected by the processor 210 using the RNG 240 from a set of hours such as $\{3, 4, 5, 6\}$. This helps minimize predictability of the existence of the attraction game 230 as the determined time Td randomly varies. A gaming machine 10 becomes initially idle, Ti, which can be based on a time when an event occurs such as when the cash out button 60 is pushed, when a cashless ticket is printed by T/O 42, the end of the last game played, etc. Any suitable event in the gaming machine 10, can be used to establish a start time when the machine becomes initially idle, Ti. The determined time, Td, can be actually determined at any suitable event by the processor 210 using internal clock 202 such as when time T1 occurs, when time Tw occurs, etc. The attraction game 230 is played only when the detection of the wager occurs after the determined period of time, Td. The term "after' means herein either "at the time Td" or "after the time Td."

In FIG. 3, the processor 210 determines that a wager has been inputted in step 300. In step 310, the processor 210 determines whether the time of the wager, Tw, is greater than (or equal to) the determined period time, Td. If Tw is less than Td, then step 320 is entered and normal play of the base game 222 in the gaming machine 10 occurs as the gaming machine 10 has not been idle long enough. Hence, if the player sits and wagers each new base game 222, the steps 300, 310, and 320 just cycle and the player plays the conventional base game in the gaming machine 10. Base game 222 playing in step 320 will reset Ti as the gaming machine is no longer idle. If the gaming machine 10 has sat idle long enough that the time of wager, Tw, is greater than or equal to the determined period of time, Td, then step 330 is entered and the attraction game 230 activates. When the attraction game is used as a trial game, the idle state of the gaming machine is not used as discussed later with respect to FIG. 10.

In step 330, the processor 210 determines which wager of a set number, n, of attraction game successive wagers has occurred. When the first wager made (Tw) by a player occurs in step 300, and the attraction game becomes activated in step 310, then the first wager is number "one" of the successive wagers. The set number, n, can be a fixed number, a variable number based on idle time or a random number picked in a range or any combination. The set number, n, can be a fixed number for all play such as 5 in which case the attraction game can only exist for five successive wagers causing the attraction game to end 335 (after the sixth wager is placed) and base game 222 play to resume in step 320. The set number, n, can be a variable number based on a variable such as when Tw occurs such as 3 successive wagers for a gaming machine idle for 2 hours, 4 successive wagers for a machine idle for 6 hours, and 5 successive wagers for a machine idle for greater than 8 hours. Any variable relationship between a number, n, and idle time (i.e., when Tw is placed) can be used herein. The set number, n, can be a random number selected by the processor in step 330 in a range of numbers such as randomly selecting a number from a set (e.g., {3, 4, 5}). Selecting a number, n, from a set adds further unpredictability to the attraction game 230. Or, any combination of the above could be used such as: randomly picking the number, n, from the following sets: idle time of 2 hours {2, 3, 4}; idle time of 6 hours {3, 4, 5, 6} and idle time greater than 8 hours {3, 4, 5, 6, 7}. Any variation of the above could be utilized in the teachings of the present invention. Whenever, step 330 determines that n plus 1 successive wagers in the attraction game have occurred, then attraction game play ends 335 and the base game 222 is played 320. Otherwise, the attraction game 230 continues in step 340.

The hidden attraction game 230 has a separate pay table 600 of awards which is used for the set number of successive wagers discussed above. The purpose of the hidden attraction game 230 is to convince the player to sit and play the idle gaming machine 10 by providing winning outcomes 110 in display 30 for each of the set number n of successive wagers.

The attraction game software 230 will not interfere with normal play of the base game in the gaming machine 10 during the set number of successive wagers. In operation of one embodiment of the invention, both the attraction game 230 and the base game 222 are played internally (unknown to the player) in response to each of the set number of successive wagers. In step 340, the processor 210 internally in the gaming machine provides both a conventional random base game 222 outcome with a game award GA for base game 222 play (but not displayed) and a random attraction game outcome with an attraction award AA for the attraction game 230 (but not displayed) in response to the wager in.

The processor 210 compares in step 350, the outcomes/awards from the base game 222 and from the attraction game 230. If the base game outcome provides an award, GA, greater than (or in a variation greater than or equal to) the attraction game outcome provided award, AA, then step 335 is entered and the attraction game ends. The player receives the base game outcome 100 in display 30 in step 320 and the base game award GA. Assume the following as an extreme example in step 350 in response to the second successive wager in 390: normal base game 222 play internally to the gaming machine results in a winning outcome of 777 with a game award, GA, of $10,000 which is much greater than any attraction outcome with an attraction award, AA. In this extreme example, step 335 (attraction game play ends) is entered from step 350 and the player receives 320 the $10,000 GA in the display 30. Steps 340 and 350 assure that the player receives fair play in playing the gaming machine. When the internal parallel the base game play provides a base game award GA greater than (or in a variation greater than or equal to) the attraction award AA in the internal attraction game outcome, the player receives it. When this occurs the gaming machine 10 is no longer idle and the attraction game 230 ends in step 335. In the extreme example above, the next wager 300 by the player follows steps 300, 310 and 320 without the attraction game 230 being activated.

As mentioned, in step 350, the processor 210 internally compares the random base game outcome award GA to the random attraction game outcome award AA for each of the set number n of successive wagers. Another illustration of this is shown in FIGS. 5 and 6 for a 3 coin-in wager. This illustration is not meant to limit the teachings of the invention. FIG. 5 is an example of a conventional base game pay table 500 in memory 220. This is also visually shown to the player of the gaming machine 10. In base game 222 play, the processor 210 conventionally uses a random number from RNG 240 to provide a base game outcome. In FIG. 5, a losing base game outcome results in a zero or null award whereas a specific winning outcome results in a base game award GA (e.g., a "2 cherry" outcome results in a 2 coin payoff for a 3 coin wager). The base game pay table 500 is conventional and has predetermined hit probabilities for each outcome (not shown). For example, the pay table 500 of FIG. 5 may have the lowest hit probability for "777/$10,000" of 0.000001 and may have the highest hit frequency of "all lose outcomes/0 coins" of 0.825. The design of pay tables and hit probabilities is well known and varies from base game 222 to base game 222. FIG. 5 is only an illustration.

The attraction game pay table 600 for this illustration is shown in FIG. 6 and uses certain of the lower award winning outcomes (and in a variation at least one losing outcome) from the base game pay table 500 of FIG. 5. FIG. 6 uses the base game outcomes corresponding to low value awards of 6 coins or less of FIG. 5. The attraction game software 230 uses certain outcomes of the base game so the player is not aware that the attraction game 230 exists or is being played. The attraction pay table 600 comprises a subset of the base game pay table outcomes corresponding to the lower awards of the base table pay table. The attraction pay table 600 of FIG. 6 while using the low award outcomes of FIG. 5 does not use the base game probabilities as the intended purpose of the invention is to convince the player that he/she is receiving low value base game outcome awards during successive wagering. When used in the attraction trial game embodiment discussed later with respect to FIG. 10, the pay table 600 may also have optional "INFO" data fields {D1, D2, D3, D4, etc.}. In this embodiment, the data fields point to memory locations in memory 220 that contain educational or informational sequences about the displayed attraction game outcome. Some new games are complex and when a particular outcome is displayed, the data sequence runs explaining the outcome to the player.

In the illustration of FIGS. 5 and 6 and in step 340, the processor 210 conventionally provides internally both a random base game outcome with a base game award GA and also an attraction game outcome with an attraction award AA. The player does not see this in the display 30 and does not know about this occurrence. In a first example, assume the base game outcome is a "losing outcome" (GA=0 coins) and the attraction game outcome is "3 blanks" (AA=3 coins). In step 350, the processor 210 compares and determines GA is less than AA and step 360 is entered. In step 360, the attraction game outcome 110 is displayed by the processor 210 in display 30 and the player receives the attraction award AA of 3 coins. This may encourage the player to sit and play.

In FIG. 3, after the attraction award AA is made 360, the player has the option to cash out in step 370 and end 380 play of the gaming machine. While this is possible, it is expected that a player generally winning at the gaming machine 10 during the attraction game 230 will continue play with the player making the next successive wager 390 in the attraction game until the next wager 390 exceeds the set number n in step 330 causing the attraction game to end 335, Any further wagering and play only occurs in the base game 320.

The method of the invention in one embodiment (without comparison 350 to an internal base game outcome) is summarized as follows. The attraction game 230 of the invention is played in a gaming machine 10 having a conventional base game 222 with a base game pay table 500. An idle time period is determined Td from when the last game play Ti of the gaming machine 10 occurred by processor 210 such as, in one variation, when a cash out signal was issued by the cash out button 60. When a wager is detected 300 in device 270 at time Tw by the processor 210 and after a determined period of idle time (Td) 310, the attraction game 230 commences play 340 in display 30 for a set number n of successive wagers 330. The detected wager 300 is the first of the successive number of wagers. For each other successive wager 300 in the play of the attraction game, the method under control of the processor 210 (1) provides an attraction game outcome 110 in the display 30 with an attraction award AA from an attraction pay table 600 (each attraction game outcome with the attraction award AA corresponding to an outcome in the base game pay table 500 having a low value base game award) and (2) awards the provided attraction award AA to the player in the display 30. End of play 335 for the attraction game occurs upon completion of the set number of successive wagers. At the end of play of the attraction game 230 based upon the n successive wagers, a value corresponding to the sum of the attraction awards awarded AA during the set number n of successive wagers mostly equals a value corresponding to the sum of the set number of successive wagers made which achieves the intended result of the invention: i.e., play of the attraction game 230 appears to a player of the gaming machine to be successive winning play of the base game and obtaining base game outcomes with base game awards and not the separate play of an attraction game. The invention uses attraction outcomes/awards identically corresponding to base game outcomes/awards having lower values.

The method of the invention in a second embodiment (with comparison 350 to the internal base game outcome) is as above for the first embodiment, but further providing a random base game outcome with a base game award from the base game pay table 500 with each attraction play outcome internally and under control of the processor 210 using the random number generator 240. The processor 210 compares 350 the provided attraction game award AA to the randomly provided base game award GA and displays the provided attraction game outcome 110 in display 30 and then makes the attraction award AA to the player when the amount of the provided attraction award AA differs by a relative value relationship over the randomly provided base game award GA. The term "relative value relationship" (RVR) herein means a relative value of "greater than" or "greater than and equal to" depending on the design of the attraction game.

Otherwise, when the amount of the provided attraction award AA does not differ by the relative value relationship over the randomly provided base game award GA, the processor 210 displays the randomly provided base game outcome 100 in display 30 and then makes the base game award GA to the player. For example, if RVR is "greater than", then the base game award GA is only awarded when the attraction game award AA is "less than or equal" to the base award GA. For example, if the RVR is "greater than or equal to", then the base game award GA is only awarded when the attraction game award AA is "less than" the base award GA. Play of the attraction game in response to displaying the randomly provided base game outcome then ends.

The following works through several examples of the play of the attraction game 230 using the illustrated pay tables of FIGS. 5 and 6.

Figure 7:
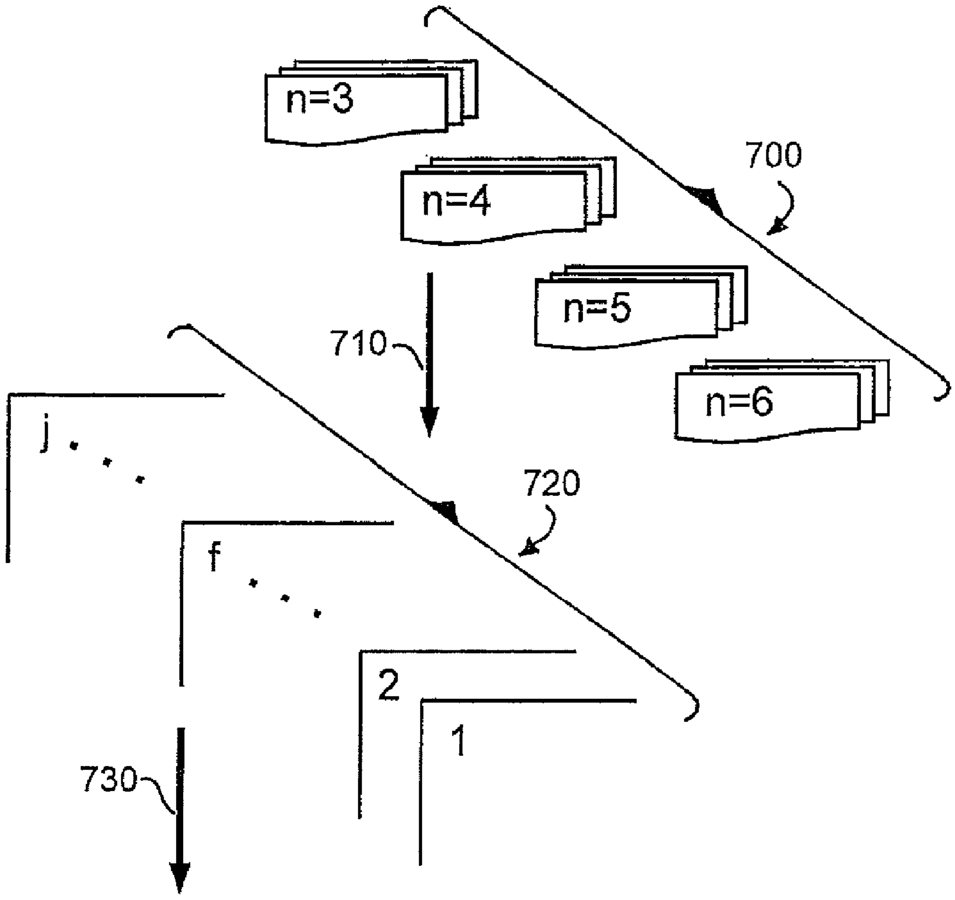
FIG. 7 is an illustration showing attraction game play in a first static outcome embodiment of the invention.

FIG. 7 sets forth the random selection 730 by the processor 210 of one static attraction game outcome/award schedule 740 from a set {1, 2, . . . j} of different outcome/award schedules 720 designed for one set of n successive wagers randomly selected 710 from a range of values 700. Each static outcome schedule in the set 720 is designed to return the value of all n successive wagers back to the player when n wagers have been made. In the example of FIG. 7 assume the processor has randomly selected 710 using RNG 240 the value of n=4 from a range 700 of values {n=3, n=4, n=5, n=6} in step 330. This illustration in FIG. 7 is based on the set number of successive wagers being 4 with a wager of 3 coins. The RVR is "greater than or equal to." The processor 210 in step 340 randomly selects 730 static schedule f (pay table 740) from the set 720 of different schedules all designed for n=4. Different sets of schedules exist for each different number n in the plurality of values 700. Schedule 740 provides static attraction game outcomes based on the pay table awards of FIG. 5 for each of the four successive wagers in the attraction game 110. In step 350, the processor 210 compares 350 the outcomes/awards from schedule 740 to each of the random base game outcomes 750 produced in response to each wager. For wager n=1, the comparison is step 350 results in the attraction game outcome "3 blanks" being selected and displayed in display 30 paying the player an award AA of 3 coins. For wager 2, the comparison results in an attraction game outcome "1 cherry" being displayed and paying the player 1 coin. At this stage, the player has wagered a total of 6 coins in and has been paid back 4 coins. The "delta" column shows a difference of 2 coins (6 coins wagered minus 4 coins paid). For wager 3, the comparison results in the attraction game outcome "2 cherries" and an award AA of 2 coins, the "delta" is now 3 coins (9 coins wagered minus 6 coins paid). For the final wager of the attraction game (n=4), the current 3 coin wager plus the "delta" coin amount must be paid so the outcome "3 bars" is displayed with an AA award of 6. This brings the delta coins down to zero (12 coins wagered minus 12 coins paid). In this example, all of the random base game outcomes and awards GA were "less than" (all are null or zero values) than the static attraction game awards AA. That is, each attraction award AA differed by the relative value relationship (RVR is "greater than or equal to") over the randomly provided base game award GA.

In a first static embodiment of FIG. 7 requires the attraction game 230 is required to pay back all coins wagered during the set number n of successive wagers to the player based on a static outcome schedule randomly selected from a group of static outcome schedules 720. Each static outcome schedule is pre-designed to be different, but each contains a subset of base game outcomes/awards. All wagers made by the player during the attraction game are paid back for all schedules 720. From the viewpoint of the casino, the gaming machine during the attraction game play is still idle as to revenue. From the viewpoint of the player, the machine is getting warm or hot as the player is receiving low value awards. Although each static schedule 740 is pre-designed, it's selection 730 is random as is the random selection 710 of the set number n. This makes it difficult for a player to ascertain the existence of a static attraction pay table used to play the attraction game 110. In a variation, each random selection 710, 730 may or may not be used and only one schedule may be provided.

In a variation, the casino (manufacturer) may want to pay more coins back to the player over the n successive wagers to heighten player interest (e.g., 12 coins wagered, 18 coins paid) so each static outcome schedule 740 in a set can be so designed. In another variation, the casino (manufacturer) may want to be paid (e.g., 12 coins wagered, 11 coins paid to player and 1 coin to casino). And, the player may seek a cash out in step 370 at a point where the "delta" has coins. For example, the player decides to cash out after the third wager where the "delta" has 3 coins. The player can receive a surprise bonus payout of 3 credits with celebration upon cash out. Or, the delta coins can be retained by the casino in the gaming machine 10 with no player benefit. A number of different variations can be designed into the random static schedules for this embodiment of the attraction game 110.

In FIG. 7, whenever the attraction award does not differ by the relative value relationship, the comparison in step 350 results in the base game outcome 100 displayed in display 30 with an award GA. The attraction game is over and the next wager-in plays 320 the base game. Should "delta" coins exist at this event, these coins in different variations can be paid as a surprise bonus or retained by the gaming machine, etc.

In a second random example relating to the embodiment of FIG. 8, each attraction game outcome/award AA is randomly selected by the processor 210 using the RNG 240 in step 340 from attraction pay table 600 of FIG. 6 in response to each wager-in of the n successive limited wagers. In the example of FIG. 8, n=5 and the wager is 3 coins. The RVR is "greater than or equal." In response to wager 1, the randomly selected attraction outcome is "2 cherries" having an AA of 2 coins which is compared 350 to the randomly selected base game "lose" outcome with a GA of 0 coins. The attraction outcome 110 is higher and displayed in display 30 with an award AA of 2 coins (delta is 1 coin). In response to wager 2, the randomly selected attraction outcome is "3 blanks" having an AA of 3 coins which is internally compared 350 to the randomly selected base game outcome of "2 cherries" with a GA of 2 coins. The attraction outcome 110 is higher and displayed in display 30 with an award AA of 3 coins (delta is 1 coin). In response to wager 3, the randomly selected attraction outcome is "1 cherry" having an AA of 1 coin which is compared 350 to the randomly selected base game outcome of "lose" with a GA of 0 coins. The attraction outcome 110 is higher and displayed in display 30 with an award AA of 1 coin (delta is 3 coins). In response to wager 4, the randomly selected attraction outcome is "3 bars" having an AA of 6 coins which is compared 350 to the randomly selected base game outcome "3 blanks" with a GA of 3 coins. The attraction outcome 110 is higher and displayed in display 30 with an award AA of 6 coins (delta is 0 coins). In response to wager 5, the randomly selected attraction outcome is "3 blanks" having an AA of 3 coins which is compared 350 to the randomly selected base game outcome of "lose" with a GA of 0 coins. The attraction outcome 110 is higher and displayed in display 30 with an award AA of 6 coins (delta is 0 coins). That is, each attraction award AA differed by the relative value relationship (RVR is "greater than or equal to") over the randomly provided base game award GA. The example of FIG. 8 randomly results in a delta difference of zero when n wagers have been played. If a delta difference greater than zero remains at wager n, it can be treated as a bonus pay out to the player or retained by the machine. If the delta difference is negative, the lose is absorbed by the gaming machine. The attraction outcomes above are randomly selected and any hit probability such as 0.25 for each attraction outcome in pay table 600 can be used. Any suitable probability can be used and each outcome can have a different probability. While FIG. 6 does not show a "lose" outcome, the attraction pay table 600 could be designed with at least one.

In a third mapping embodiment, the processor 210 using the RNG 240 can randomly select at least attraction outcome/awards AA for n=1 through n=n−1 wagers as done above in FIG. 8. However, to provide a full return of the value of all successive wagers so that "delta" is zero at the nth successive wager, the processor 210 can map the last attraction outcome/award AA for at least the nth wager so that a delta difference of zero is obtained. As shown in FIG. 9, at wager n−2, the delta difference is 1 coin. The processor randomly selects the attraction outcomes from n=1 through n=n−2. The player wagers, at wager n−1, 3 coins and receives a random attraction outcome "1 cherry" and an award AA of 1 coin. This causes the delta difference to increase by 2 coins to a value of 3. For the n wager of 3 coins, the processor 210 does not randomly select the attraction outcome, but looks up 900 in the attraction pay table 600 for an attraction outcome that provides the delta difference of 3 coins: (e.g., "3 blanks"). This looked-up outcome is then displayed 910 in display 30 and the player receives the "3 blanks" outcome and 3 coins in pay out. The delta difference becomes zero. The player has been paid back all coins wagered during the n wagers through this mapping process. The mapping process can also start at n−2, etc. Through game design, the pay table 500 values in the base game 222 can be designed with low value payout combinations to accomplish this mapping process to result in a delta of zero in response to the wager n. For example, providing base game outcomes having GAs of: 1, 2, 3, 4, 5, 6 coins which would provide attraction outcomes having awards AA of: 1, 2, 3, 4, 5, 6 coins. In a variation of mapping, whenever a random attraction outcome results in a "delta" value greater than the largest AA in the attraction pay table, then that attraction outcome is not used and an attraction outcome is selected by the processor that brings the "delta" value down to at least the largest AA.

Three embodiments have been discussed above for FIGS. 7 (static), 8 (random), and 9 (mapping) and variations thereof to provide pay back that mostly equals the wagers made during play of the attraction game. This results in a drifting, or any player, playing a clearly idle machine and then being attracted to it through a series of successive winning outcomes and associated awards AAs. The player is not made aware that an attraction game is being played as all play outcomes displayed correspond to outcomes and awards for the base game pay table. Based on the randomness built into the attraction game 230 of selecting the idle time before playing the attraction game, the number of successive wagers n and displaying the attraction outcomes, the player would find it difficult to ascertain play of the attraction game 230 from play of the base game 222. As a result, the player may think the base game 222 is warm or hot and continue playing the actual base game.

The term "mostly equals" is defined herein to at least mean, but is not limited to: (1) equal (the value of all attraction awards awarded equals the value of all successive wagers made); (2) within plus or minus the value of one wager (the value of all attraction awards awarded equals within a range of plus or minus one wager of the value of all successive wagers made); or (3) within plus or minus one unit of the wager. For example, if the wager is 3 coins and the set number n is 5 successive wagers, then the total value wagered is the sum of the set number of wagers made or 15 coins, the term "mostly equal" would be for the above mean: (1) the sum of all attraction awards awarded for the 5 successive wagers equals a value of 15 coins awarded; (2) the sum of all attraction awards awarded for the 5 successive wagers would be a value in a range of 12 coins to 18 coins (15 coins plus or minus one wager); or (3) as the wager is 3 coins, a unit is 1 coin, the sum of all attraction awards awarded for the 5 successive wagers would be a value in a range of 14 to 16 coins (15 coins plus or minus one coin).

In summary, the gaming machine 10 of the invention provides in a memory 220 a conventional base game 222 and its pay table 500. The memory 220 also contains the hidden attraction game 230 with its pay table 600. The hidden game pay table 600 contains only hidden attraction game outcomes/awards that correspond to base game pay table 500 outcomes having low value awards. The processor 210 in the gaming machine 10 is operatively connected to at least a display 30, a wager detector 270, a random number generator 240 and the memory 220. The processor 10 detects a wager 300 and determines 310 whether the wager has occurred Tw after a determined period of idle time Td since the time last game play Ti of the gaming machine. If so, the processor 210 plays 340 both the hidden attraction game 230 and the conventional base game 222 for each of a set number of successive wagers. The processor 210 displays the attraction game outcomes 100 with their attraction awards AA when each said attraction award AA differs by a relative value relationship, RVR, over the value of the base game award GA for each of the set number of successive wagers. Otherwise, the processor 210 displays the first base game outcome and base game award that is higher, based on the relative value relationship to the attraction award. The processor 210 ends play 335 of the hidden attraction game 230 when the set number of successive wagers has been made 330 or when the first base game outcome with base game award is displayed 350.

While the above disclosure is primarily directed to "idle" gaming machines, the following adapts this disclosure into the environment of remotely accessed gaming machines (such as leased gaming machines) as discussed in U.S. Pat. No. 7,908,169. In FIGS. 14 and 15 of the '169 patent, attraction sequences are used to attract players to play by use of videos with sound, etc. The attraction game of the invention can be used as a different type attraction sequence. In one embodiment shown in FIG. 10, the Lessor (e.g., the manufacturer) of the gaming machine uses the invention for an announced trial play such as with a new game. In another embodiment shown in FIG. 11, the Lessor may decide to invest in an idle gaming machine using the hidden attraction game, especially if it is a new gaming machine that is not being played.

Figure 10:
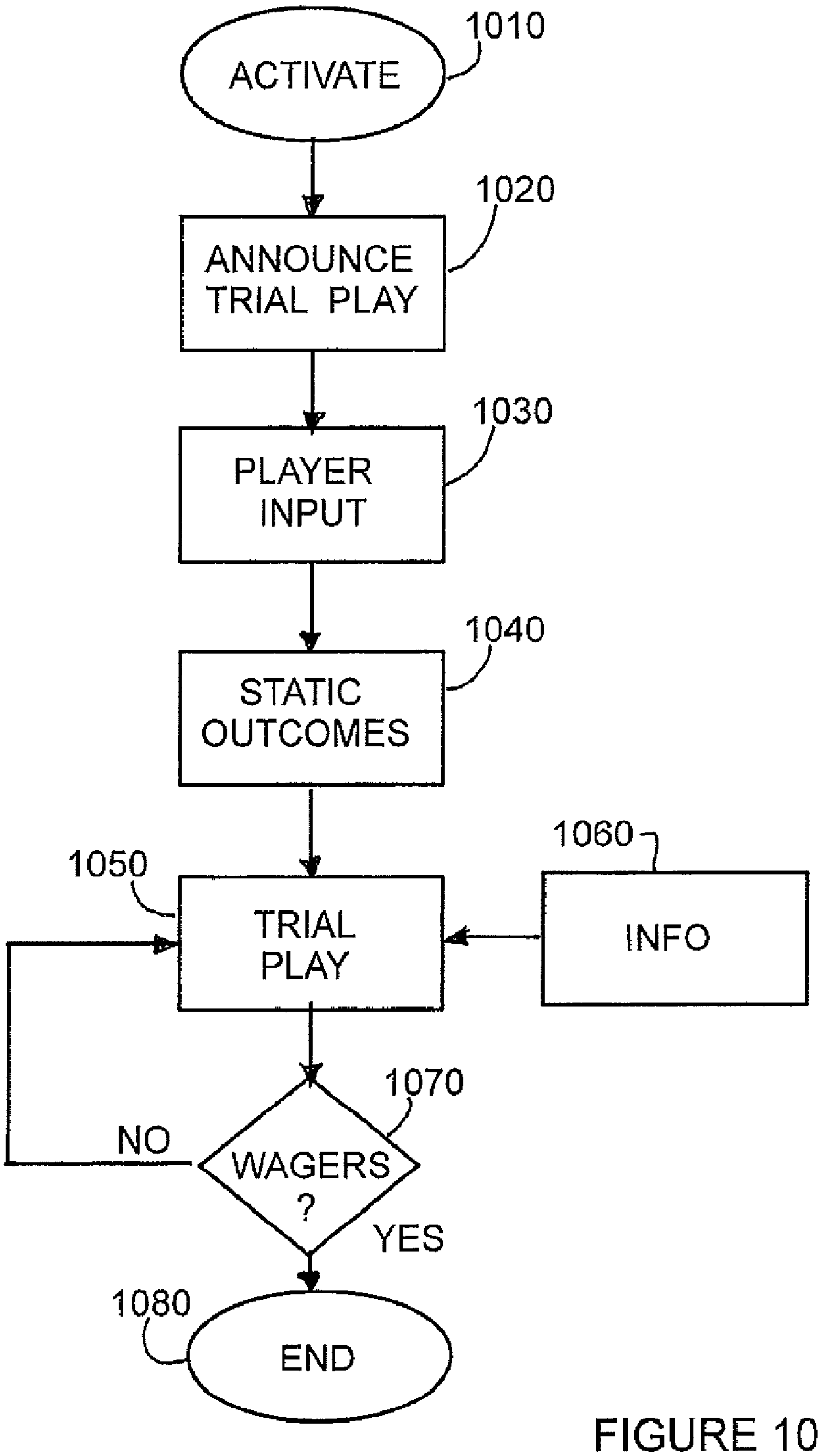
FIG. 10 is a functional flow chart showing the method of play for the attraction trial game of the invention.

The Lessor may have a controller 1000 located remote from the gaming machine 10, but in communication over the network 252 with the gaming machine's network card 250 as shown in FIG. 2. Any of a number of different conventional communication links can be used for the controller 1000 to communicate with an individual gaming machine. In FIG. 10, the method of the trial play embodiment of the invention is shown within the gaming machine 10 using the various components of FIGS. 1 and 2 to implement the method. The controller 1000 activates (or can de-activate) the trial play attraction game of the invention in step 1010. Any necessary data required to implement operation of the trial play can be delivered into (or it can already be resident in) memory 220. In step 1020, the processor 210 displays an attraction sequence such as a video with animation, sounds, and special effects announcing that the base game may be trial played for a set number of successive wagers at no cost to the player. However, the player must wager to play the trial attraction game which provides a real play look and feel. The player in step 1030 activates the trial attraction game by, for example, touching an area on the touch screen 30 (or inputting a wager, etc.) which is detected by the processor 210. As set forth above one or a set of static outcome schedules are provided 1040 for the trial game (the static tables may or may not be randomly selected). Play of the attraction game occurs in step 1050 for each of the n successive wagers. For each wager, a trial game outcome is displayed as discussed above for the hidden attraction game. For example, the pay table 600 of FIG. 6 could be used with the static outcome schedules of FIG. 7. For each wagered on and displayed outcome, information {D1, D2, D3, D4, etc.} may also be displayed 1060 in display 30 explaining the displayed outcome so as to educate the player in play of the base game 222. In this variation, the pay table 600 of FIG. 6 has an information data field 610 associated with each outcome which points to an information presentation area in memory 220. In step 1070, when n successive wagers have been made 1070, the trial play ends 1080. As discussed above for static outcome schedules 740, the player always receives all wagers made back. Should, the player cash out before the trial play is over, then the player receives the "delta difference" as discussed above. In this manner, the player plays the trial game and learns about the game using actual wagers, but receiving the full amount wagered back. The Lessor controller 1000 may control when to activate the trial attraction game (step 1020), the number of successive wagers, the provision of static play payouts, the information to be displayed for each trial game outcome, etc.

In summary of FIG. 10, a method of playing an attraction trial game is set forth. The gaming machine displays an attraction sequence to induce players to play the attraction trial game. When the gaming machine receives a player input (such as touching the touch screen or making a wager), the attraction trial game commences play in the display under control of a processor for a set number of successive wagers. For each successive wager detected in the set number, an attraction trial game outcome is displayed with an attraction. Each attraction trial game outcome with the attraction award corresponds to a base game outcome in the base game pay table having a base game award. Play ends after the set number of successive wagers occurs wherein a value corresponding to the sum of the attraction awards awarded during the set number of successive wagers at least equals a value corresponding to the sum of the set number of successive wagers made. The intended purpose is obtained in that the play of the attraction trial game appears to a player of the gaming machine to be play of the base game with actual wagers and with winning base game outcomes and base game awards (but the player knows it to be trial play).

In the invest embodiment, the hidden attraction game discussed above with respect to FIG. 3 may be further operated by the controller 1000. The controller 1000 over network can provide the idle time Td, the set number n, etc. for the method of FIG. 3. The Lessor may want to invest a certain amount of money to overcome gaming machine idleness. For example, the static attraction outcome schedules 740 for n successive plays (see FIG. 7) may provide a "delta" value for the last successive wager that is not "zero", but pays the player. That is, the controller provides a "delta" with an end value such as "minus coins" (i.e., minus means the player is paid more than what was wagered and the gaming machine is in the negative). As fully described above, each static outcome schedule 740 for n successive wagers can be pre-designed to be "zero" at the end or in this invest embodiment with a fixed value. The Lessor can pre-design any number of static outcome schedules that invest differing amounts of money and which can then be randomly selected or not.

An example of this is shown in FIG. 11 based on the paytable of FIG. 6. In this example, the set number of successive wagers is four for a total wager by the player of 12 coins (each wager is 3 coins). At wager 1, the "3 bars" static outcome is 6 coins with a "delta" of minus 3 coins. At wager 2, the "1 cherry" static outcome pays 1 coin with a "delta" of minus 1 coins. At wager 3, the "3 blanks" static outcome is 3 coins with a "delta" of minus 1 coin. At wager 4, the "3 bars" static outcome pays 6 coins with a "delta" of minus 4 coins. The Lessor (or casino operator, etc.) pre-designed the static outcome schedule 1200 of FIG. 11 for an investment of 4 coins. The player, unaware of the hidden attraction game 230, experiences a winning streak (12 coins wagered, 4 successive wins, and 16 coins returned) and may well stay and continue play of the base game as discussed above. And, as discussed above with respect to FIG. 3 and in the optional step 350, the player may also receive the benefits of any wins in the parallel base game play. The mapping embodiment of FIG. 9 can also enable the Lessor to invest in over coming idleness, by mapping "delta" to provide a fixed negative value (rather than "zero") for the last successive wager. The player of the hidden attraction game receives more back than wagered at the end of the hidden attraction game play and may believe the gaming machine is warm or hot and continue to play. As the player is not aware of the existence of the hidden attraction game, the player cannot abuse the "invest" feature.

In summary, in the method of playing a hidden attraction game set forth in FIG. 11, the process is similar to that of FIG. 3 except that play of the hidden attraction game ends after the set number of successive wagers occurs with a value corresponding to the sum of the attraction awards awarded during the set number of successive wagers that is greater than a value corresponding to the sum of the set number of successive wagers made. That is, the Lessor invests in promoting play of the base game with the intended purpose that play of the hidden attraction game appears to a player (as the player is not aware of the hidden attraction game) of the gaming machine to be play of the base game with winning base game outcomes and with base game awards that exceeds the value of wagers made by the player during the set of successive wagers.

The above disclosure sets forth several basic embodiments of the invention described in detail with respect to the accompanying drawings with a number of variations discussed. While the above disclosure uses a three reel, single pay line base game outcome for illustration purposes, the invention applies to multi-reel, multi-pay line base games where a player may play one or more pay lines with one or more bets per pay line. A max bet would wager the largest bet for all pay lines. Generally, wagering on multiple pay lines in one base game play is comparable to wagering on a series of single pay lines in successive multiple base game plays.

The term "leased gaming machine" is defined herein to not only includes gaming machines leased by others (such as by manufacturers, etc.) to casinos, but the term also includes gaming machines in a casino connected to a remote controller over a communication network (such as those connected to the casino's central controller which is remote from the gaming machines).

Certain precise values have been utilized in the specification to illustrate and provide examples for the invention. However, these values do not limit the scope of the claimed invention and thus variations can occur.

It is noted that the terms "preferable" and "preferably," are given their common definitions and are not utilized herein to limit the scope of the claimed disclosure. Rather, these terms are intended to highlight alternative or additional features that may or may not be utilized in a particular embodiment of the present disclosure.

For the purposes of describing and defining the present disclosure it is noted that the term "substantially" and "mostly" are given their common definition and it is utilized herein to represent the inherent degree of uncertainty that may be attributed to any other representation. The term "whereby" is used herein to only express the intended purpose or result of the claimed invention and is not used to limit the claims herein.

Those skilled in this art will appreciate that various changes, modifications, and other embodiments could be practiced under the teachings of the invention without departing from the scope of this invention as set forth in the following claims or in claims in applications claiming priority to this application.

I claim:

1. A method of playing an attraction trial game in a leased gaming machine, the leased gaming machine having a base game with a base game pay table, the method comprising:

determining a time when to attract players to play the attraction trial game at the leased gaming machine in a remote controller connected to the leased gaming machine over a communication network;

displaying, on a display of the leased gaming machine, an attraction sequence for the attraction trial game when the time to attract occurs from the remote controller over the communication network, wherein the attraction sequence announces on the display that the attraction trial game can be played;

receiving an input from a player in the leased gaming machine to start play of the attraction trial game in response to displaying the attraction sequence;

playing the attraction trial game, in a display of the leased gaming machine under control of a processor, for a set number of successive wagers detected in the leased gaming machine in response to receiving the input; for each successive wager detected in the set number, the method further comprising:

1.) providing an attraction trial game outcome in the display with an attraction award based on an attraction pay table in a memory of the leased gaming machine, each attraction trial game outcome with the attraction award corresponding to a base game outcome in the base game pay table having a base game award; and 2.) awarding, in the display of the leased gaming machine, the provided attraction award; and ending play of the attraction trial game in the leased gaming machine after the set number of successive wagers occurs, at the end of play of the attraction trial game a value corresponding to the sum of the attraction awards awarded during the set number of successive wagers at least equaling a value corresponding to the sum of the set number of successive wagers made, whereby play of the attraction trial game appears to a player of the leased gaming machine to be play of the base game with winning base game outcomes and base game awards.

2. The method of claim 1 further comprising:

delivering to the leased gaming machine, from the remote controller over the communication network, at least the set number for how many successive wagers are made.

3. The method of claim 1 further comprising:

providing at least a static attraction outcome schedule for the attraction trial game play having a predetermined attraction trial game outcome with a corresponding attraction award for each of the set number of successive wagers from the remote controller over the communication network; wherein the value of the attraction awards awarded during the set number of successive wagers equals the value of the set number of successive wagers made.

4. The method of claim 1 further comprises:

providing an informational sequence in the display with at least one attraction trial game outcome that explains at least one aspect of the play of the base game.

5. The method of claim 1 wherein providing an attraction trial game outcome further comprises:

selecting an attraction trial game outcome, in the leased gaming machine, from the attraction pay table for at least the last wager in the set number of successive wagers to cause the value of the attraction awards awarded during the set number of successive wagers to equal the value of the set number of successive wagers made.

6. The method of claim 1 wherein determining the time comprises:

determining the time based on an idle time from last play of the leased gaming machine.

7. The method of claim 1 wherein receiving an input comprises:

receiving a wager in the leased gaming machine from the player.

8. The method of claim 1 wherein the leased gaming machine includes a gaming machine connected to the remote controller over the communication network.

9. The method of claim 1 wherein receiving an input comprises:

touching the display of the leased gaming machine by the player.

* * * * *